(12) United States Patent
Irie et al.

(10) Patent No.: US 6,354,747 B1
(45) Date of Patent: Mar. 12, 2002

(54) OPTICAL MODULE

(75) Inventors: Takeshi Irie; Kazunori Kurima; Ichiro Tonai; Toshio Mizue; Daisuke Takagi, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/219,901

(22) Filed: Dec. 24, 1998

Related U.S. Application Data

(63) Continuation-in-part of application No. 08/917,388, filed on Aug. 28, 1997, now Pat. No. 5,963,693.

(30) Foreign Application Priority Data

| Aug. 26, 1996 | (JP) | 8-223931 |
| Oct. 4, 1996 | (JP) | 8-264812 |
| Jul. 25, 1997 | (JP) | 9-200076 |
| Dec. 25, 1997 | (JP) | 9-357381 |
| Dec. 25, 1997 | (JP) | 9-357384 |

(51) Int. Cl.⁷ .............................. G02B 6/36
(52) U.S. Cl. ............... 385/88; 385/91; 385/93; 385/94
(58) Field of Search .................. 385/88–94

(56) References Cited

U.S. PATENT DOCUMENTS

| 4,186,996 A | * 2/1980 | Bowen et al. ............. 385/88 |
| 4,273,413 A | * 6/1981 | Bendiksen et al. ......... 385/88 |
| 4,410,469 A | 10/1983 | Katagiri et al. ............ 264/1.5 |
| 4,479,696 A | * 10/1984 | Lubin et al. .............. 385/88 |
| 4,533,209 A | * 8/1985 | Segerson et al. .......... 385/88 |
| 4,639,077 A | * 1/1987 | Dobler .................... 385/88 |
| 4,911,519 A | 3/1990 | Burton et al. ............. 350/96.2 |
| 5,032,898 A | * 7/1991 | Bowen et al. ............. 357/81 |
| 5,113,466 A | 5/1992 | Acarlar et al. ............ 385/88 |
| 5,127,071 A | 6/1992 | Go ....................... 385/73 |
| 5,475,783 A | 12/1995 | Kurashima ............... 385/92 |
| 5,524,160 A | * 6/1996 | Debeaux et al. .......... 385/92 |
| 5,537,503 A | * 7/1996 | Tojo et al. ............... 385/93 |
| 5,548,676 A | * 8/1996 | Savage, Jr. .............. 385/92 |
| 5,596,665 A | 1/1997 | Kurashima et al. ........ 385/92 |
| 5,742,480 A | 4/1998 | Sawada et al. ........... 361/749 |

FOREIGN PATENT DOCUMENTS

| EP | 395 607 | 10/1990 |
| JP | 7-297479 | * 11/1995 |
| WO | 96-13065 | 5/1996 |

OTHER PUBLICATIONS

Patent Abstracts of Japan, vol. 013, No. 319 (P–901), Jul. 19, 1989 & JP 01 088409 A (NEC CORP), Apr. 3, 1989.

* cited by examiner

Primary Examiner—Ellen E. Kim
(74) Attorney, Agent, or Firm—Pillsbury Winthrop LLP

(57) ABSTRACT

The present invention relates to an optical module or the like having a structure which prevents the efficiency in a sleeve securing operation or optical characteristics from deteriorating and improves adhesion durability. In particular, a resin mold portion including an optical device in the optical module according to the present invention is processed into a shape which can directly irradiate the UV-curable resin introduced between the resin mold portion and the sleeve with ultraviolet rays, and a structure for restricting the flow of the resin changing into a flowing state during the sleeve securing operation or a structure for improving the adhesion durability of the sleeve is provided on at least one of the sleeve side and resin mold portion side.

16 Claims, 15 Drawing Sheets

(b)

OPTICAL MODULE

RELATED APPLICATION

This application is a continuation-in-part of application Ser. No. 08/917,388, filed on Aug. 28, 1997, now patented with U.S. Pat. No. 5,963,693.

BACKGROUND OF THE INVENTION

1. Field of the Invention

The present invention relates to an optical module applicable to an optical data link used for optical communications; and, in particular, to a structure for attaching a sleeve to a head portion in which an optical device such as light-receiving device or light-emitting device is molded with a resin.

2. Related Background Art

A conventional optical module comprises, at least a can-shaped TO (Transistor Outline) type standard package which incorporates an optical device such as light-emitting device or light-receiving device therein and is mounted with a condenser lens. To the TO type standard package, an alignment sleeve for receiving an optical fiber ferrule attached to a tip of an optical fiber acting as an optical transmission line has been secured with the aid of an adhesive (see U.S. Pat. No. 5,596,665).

Here, since the housing of the TO type standard package accommodating the optical device therein is made of a metal, the optical module tends to become expensive and larger in size, while being hard to be processed into a desirable form and thus being low in its freedom of design. Therefore, in place of such a metal package, optical modules of an integrated structure in which an optical device such as light-emitting device or light-receiving device directly mounted on a lead frame is molded with a plastic resin have been proposed (see U.S. Pat. Nos. 4,410,469 and 4,539,476).

Namely, as shown in FIG. 1, a conventional optical module comprises a head portion 2 (resin mold portion) molding an optical device mounted on a lead frame with a transparent resin, a body portion 4 (resin mold portion) molding an electronic device mounted on the lead frame with an opaque resin, and a plurality of lead pins 6 (connecting portion) for electrically and mechanically connecting these resin mold portions 2 and 4 to each other.

Further secured to a front end part 2a of the head portion 2 is an opaque cylindrical sleeve 8 for receiving an optical fiber ferrule. As the optical fiber ferrule is inserted into the cylindrical sleeve 8, the conventional optical module can automatically align the optical fiber and the optical device in the head portion 2 with each other in terms of optical axis.

The operation of securing the cylindrical sleeve 8 to the head portion 2 has been carried out such that, as shown in FIG. 2, the front end part 2a of the head portion 2 is inserted into an insertion hole 8a formed at the rear end part of the cylindrical sleeve 8, the gap between the inner wall face of the insertion hole 8a and the surface of the front end part 2a is filled with a UV-curable resin 100, and then the UV-curable resin 100 is cured upon irradiation with ultraviolet rays UV. Alternatively, the securing operation may be carried out such that a thermosetting resin is injected into the above-mentioned gap in place of the UV-curable resin, and then thus injected resin is cured upon heating.

SUMMARY OF THE INVENTION

Having studied the above-mentioned conventional art from various viewpoints, the inventors have found the following problems.

1) First, when using a UV-curable resin for bonding the sleeve, the irradiation efficiency of ultraviolet rays must be taken into consideration.

As shown in FIGS. 1 and 2, the head portion 2 has a structure in which the front end part 2a shaped like a circular truncated cone and a rectangular base 2b larger than the front end part 2a are integrally molded by transfer molding. Consequently, when securing the cylindrical sleeve 8 to the head portion 2 with the aid of the UV-curable resin 100, these members are irradiated with ultraviolet rays UV in the state where the base 2b abuts to the rear end part of the cylindrical sleeve 8. Here, since the cylindrical sleeve 8 is opaque to the ultraviolet rays UV, it is necessary for the ultraviolet rays UV to be emitted toward the gap between the insertion hole 8a of the cylindrical sleeve 8 and the front end part 2a of the head portion 2 from the rear side of the base 2b.

In practice, however, the gap filled with the UV-curable resin 100 is blocked with the base 2b, thereby the UV illuminance would inevitably decrease even when the head portion 2 is a resin mold body transparent to the ultraviolet rays. As a consequence, it has taken a long time to fully solidify the UV-curable resin 100.

2) On the other hand, when using a thermosetting resin for bonding the sleeve, attention has to be paid to the handling of the excess part of the filling resin in particular.

Though the thermosetting resin introduced as an adhesive cures upon the heating processing after the injection, the thermosetting resin has such a characteristic that, with its viscosity once decreasing upon heating, it spreads out into the gap between the inner wall face of the sleeve 8 and the front end part 2a before curing. As a consequence, when the viscosity of the thermosetting resin once decreases, there is a possibility of the excess thermosetting resin flowing into a ferrule insertion hole 8b positioned on the opposite side of the insertion hole 8a or adhering to the condenser lens 2c mounted to the front end part 2a. This phenomenon is not negligible since the amount of injection of resin cannot be reduced in order to attain a sufficient bonding strength.

For example, if the excess thermosetting resin that has flowed into the insertion hole 8b cures, then, upon inserting the ferrule therein, the optical fiber received therein and the condenser lens will shift from each other in terms of optical axis. On the other hand, the excess thermosetting resin attached to the surface of the condenser lens 2c causes the optical function of the condenser lens 2c to deteriorate, thereby the optical module would lower its optical characteristics. In particular, when the front end part 2a and the insertion hole 8a of the sleeve 8 are made smaller in response to the demand for reducing the size of the optical module, then the gap between the side wall of the front end part 2a and the inner wall face of the sleeve 8 becomes narrower. As a consequence, the thermosetting resin with its viscosity lowered upon heating is more likely to spread out due to the capillary action, thereby flowing into the deep part of the insertion hole 8b or adhering to the surface of the condenser lens 2c by a large amount.

3) In addition, when taking account of the environment where the optical module is actually used, it is preferred that the adhesion durability of the sleeve be improved.

As a method of molding a resin mold portion (head portion 2 or body portion 4) or sleeve in conventional modules, it is common to use transfer molding in which a plastic resin is injected into a die having a cavity with a predetermined form and is molded therein. The surface of thus obtained resin mold portion or sleeve is processed as smooth as possible in view of die-cutting or the like.

In the case where a sleeve is secured to such a resin mold portion with the aid of an adhesive such as UV-curable resin, smooth surfaces inevitably face each other with the adhesive interposed therebetween. As a consequence, it has been difficult to improve durability in the conventional optical modules against expected changes in their use environment (e.g., temperature changes within the range from −40° C. to +85° C., moisture changes, and the like).

It is an object of the present invention to provide an optical module comprising a variety of structures for overcoming the problems mentioned above.

The optical module according to the present invention is applicable to an optical data link for connecting an optical fiber transmission line and an electric signal transmission line to each other and comprises an integrated structure constituted by a head portion molding an optical device such as light-emitting device or light-receiving device as a whole with a resin and an alignment sleeve attached thereto. This sleeve is secured to the head portion, in a state accommodating at least a part of the head portion therein, with an adhesive interposed therebetween.

A first embodiment of the optical module according to the present invention comprises a structure for improving the working efficiency when a UV-curable resin such as that mentioned above is used. Namely, the optical module according to the first embodiment comprises a head portion molding an optical device as a whole with a resin; and, a hollow sleeve, extending along a predetermined reference axis, provided with an opening for accommodating at least a part of the head portion therein. The sleeve, in a state accommodating a part of the head portion therein via the opening thereof, is secured to the head portion with an adhesive interposed therebetween.

In particular, in the optical module according to the first embodiment, the part of the head portion accommodated in the sleeve has a side face tilted with respect to the reference axis by a first angle, whereas the remaining part of the head portion exposed from the sleeve has a side face tilted with respect to the reference axis by a second angle which is equal to or smaller than the first angle. Preferably, of the head portion, the remaining part exposed from the sleeve has a cross-sectional area orthogonal to the reference axis equal to or smaller than the cross-sectional area of the head portion matching the opening face of the sleeve. Here, the head portion is designed such that the maximum value of the cross-sectional area of the head portion orthogonal to the reference axis is smaller than the opening area of the sleeve.

When the part of the head portion (the rear end part of the head portion) exposed from the sleeve has a cross-sectional area equivalent to or smaller than the maximum cross-sectional area of the head portion, then the gap filled with the UV-curable resin can be exposed to a UV source. Consequently, the ultraviolet rays from the UV source directly irradiate the filling UV-curable resin.

A second embodiment of the optical module according to the present invention comprises a structure for effectively preventing optical characteristics from deteriorating when a thermosetting resin such as that mentioned above is used. As with the optical module according to the first embodiment, the optical module according to the second embodiment comprises a head portion molding an optical device as a whole with a resin; and, a sleeve, extending along a predetermined reference axis, secured to the head portion, in a state accommodating at least a front end part of the head portion therein, with an adhesive interposed therebetween.

In particular, the optical module according to the second embodiment further comprises a restriction structure, provided in at least one of the sleeve and head portion, for restricting a flow of the adhesive injected between the sleeve and the front end part of the head portion accommodated in the sleeve. As the flow of excess adhesive is restricted, the adhesive is prevented from unnecessarily spreading out.

The restriction structure can be realized when the inner wall face of the sleeve mating with the front end part of the head portion is provided with a depression for reserving the excess part of adhesive flowing upon heating. Preferably, a surface of the head portion is provided with a lens body positioned on the reference axis, and the depression is arranged such as to surround the lens body continuously or intermittently.

Alternatively, the restriction structure may be provided on the head portion side. Namely, the restriction structure can also be realized when the front end part of the head portion accommodated in the sleeve is provided with a restriction protrusion continuously or intermittently surrounding the lens body attached to the surface of the front end part of the head portion. Here, the method of introducing the adhesive for filling the gap between the sleeve and the head portion is not limited to the introduction via the opening of the sleeve. Namely, when the sleeve is provided with a plurality of through holes communicating the outer peripheral surface of the sleeve and the accommodation space for the front end part to each other, then the adhesive can be introduced via these plurality of through holes as well.

A third embodiment of the optical module according to the present invention comprises a structure for improving the adhesion durability of the sleeve in a bonding operation such as that mentioned above. As with the optical modules according to the first and second embodiments, the optical module according to the third embodiment comprises a head portion molding an optical device as a whole with a resin; and, a sleeve, extending along a predetermined reference axis, secured to the head portion, in a state accommodating at least a front end part (first protrusion) of the head portion therein, with an adhesive interposed therebetween.

In particular, for improving the adhesion durability between the front end part and the sleeve in the head portion in the optical module according to the third embodiment, at least one of the sleeve and head portion is provided with a bonding strength enhancing structure for enhancing the bonding strength between the sleeve and the head portion.

Specifically, the bonding strength enhancing structure can be realized when at least the sleeve, mainly at the inner wall face thereof mating with the front end part of the head portion, is provided with a thread groove. This thread groove does not only yield an anchor effect as the adhesive pervades there. When a thread groove is also formed in the front end part surface of its opposing head portion, the position of the ferrule facing the head portion with the aid of the sleeve can be adjusted. Namely, engaging the respective thread grooves formed in the sleeve and front end part surface of the head portion with each other enables the positional adjustment of the sleeve along its center axis, thereby the distance between the end face of the optical fiber supported by the ferrule and the optical device within the head portion can be controlled accurately.

The bonding strength enhancing structure can also be realized when at least one of the inner wall face of the sleeve and the front end part surface of the head portion accommodated in the sleeve is provided with a protrusion pattern having a predetermined height formed by surface processing such as etching.

Though the surface processing may be carried out after the resin molding of the sleeve or head portion; since a superfluous manufacturing step is added thereby, it is more preferred that the inner wall face or front end part surface be embossed. As the adhesive pervades the embossed surface, the bonding strength between the sleeve and the front end part increases. The embossment is constituted by a plurality of depressions having a maximum depth of about 10 μm, preferably within the range of 10 μm to 20 μm. It is due to the fact that a sufficient bonding strength may not be obtained when the depressions are too shallow, whereas the sleeve and the like may not be pulled out of the die after the resin molding when the depressions are too deep. The bonding strength between the sleeve and the head portion depends not only on the depth of the depressions constituting the embossment but also on the form of the embossed surface. As a consequence, the embossment formed in the optical module according to the present invention in order to attain a desirable bonding strength is constituted by a plurality of depressions having a maximum diameter of 20 μm to 50 μm, while the depressions constituting the embossment occupy about 80%, preferably 60% to 90%, of the embossed surface.

Further, the bonding strength enhancing structure can also be realized by providing an auxiliary wall (second protrusion) surrounding the front end part of the head portion, and bonding and securing the sleeve to the head portion in a state where the opening part of the sleeve is held between the front end part and the auxiliary wall. In this structure, the bonding areas in the head portion and in the sleeve would be nearly twice as much as those in the conventional optical module, thereby the bonding strength would also improve remarkably as compared with that conventionally attained. Also, in the optical module according to the third embodiment, a structure in which a protrusion such as an auxiliary wall is formed near the front end part of the head portion and a structure in which the sleeve side or head portion side is subjected to surface processing such as embossing can be combined together.

BRIEF DESCRIPTION OF THE DRAWINGS

FIGS. 4A and 4B are views for explaining the configuration of the first embodiment of the optical module according to the present invention, in which FIG. 4A is a sectional configuration of the head portion in the optical module, whereas FIG. 4B is a plan view of the sleeve and head portion as observed from the direction indicated by the arrow C in FIG. 4A;

FIGS. 7A and 7B are views for explaining another securing operation for the sleeve in the optical module according to the second embodiment (views for explaining a method of making the optical module according to the present invention), in which FIG. 7A is a partly fragmentary view of the sleeve to be bonded, whereas FIG. 7B is a sectional view of the sleeve taken along the I—I line shown in FIG. 7A;

FIGS. 8A and 8B are views for explaining a first applied example of the optical module according to the second embodiment, in which FIG. 8A is a perspective view of the head portion of the optical module, whereas FIG. 8B is a sectional view showing the state of bonding between the sleeve and the head portion shown in FIG. 8A;

FIGS. 9A and 9B are views for explaining a second applied example of the optical module according to the second embodiment, in which FIG. 9A is a perspective view of the head portion of the optical module, whereas FIG. 9B is a sectional view showing the state of bonding between the sleeve and the head portion shown in FIG. 9A;

FIGS. 10A to 10C are views for explaining the third embodiment of the optical module according to the present invention, in which FIG. 10A is a perspective view of the sleeve, whereas FIGS. 10B and 10C are sectional views for explaining a securing operation for the sleeve taken along the line II—II in FIG. 10A;

FIG. 11A is a perspective view showing dies for making the sleeve in the third embodiment, whereas

FIGS. 13A and 13B are views for explaining a first applied example of the optical module according to the third embodiment, in which FIG. 13A is a perspective view of the sleeve in the first applied example, whereas FIG. 13B is a sectional view for explaining a securing operation of the sleeve taken along the IV—IV line in FIG. 13A;

FIGS. 14A and 14B are views for explaining a second applied example of the optical module according to the third embodiment, in which FIG. 14A is a perspective view of the sleeve in the second applied example, whereas FIG. 14B is a sectional view for explaining a securing operation of the sleeve taken along the V—V line in FIG. 14A;

FIG. 15A is a perspective view showing an applied example of a receiver optical module, whereas

DETAILED DESCRIPTION OF THE PREFERRED EMBODIMENTS

In the following, embodiments of the optical module according to the present invention will be explained with reference to FIGS. 3A to 5D, 6, 7A to 15B, 16, and 17. Among the drawings, parts or members identical to each other will be referred to with numerals or letters identical to each other, without their overlapping descriptions being repeated. In this specification, the optical module encompasses receiver optical modules for receiving signal light and converting thus received signal light into an electric signal, and transmitter optical modules for converting an electric signal to signal light.

FIGS. 3A to 3E are views for explaining configurations of a receiver optical module Rx and a transmitter optical module Tx together with their manufacturing steps.

Figure 3A:
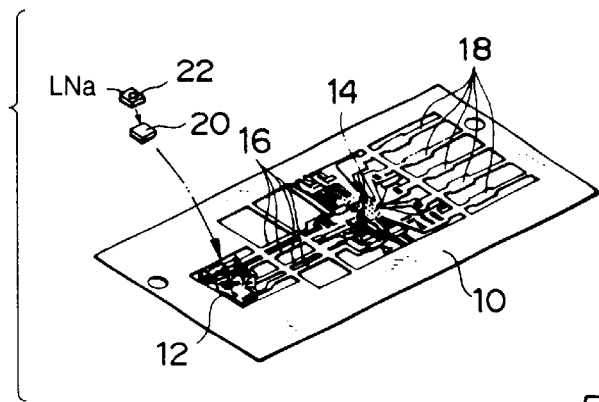
FIGS. 3A to 3E are views for explaining configurations of optical modules (receiver optical module and transmitter optical module) according to the present invention together with their manufacturing steps.

First, a metal lead frame 10 for making the optical module is prepared. As shown in FIG. 3A, formed by diecutting in the lead frame 10 are a first mount portion 12 for mounting an optical device 22 such as light-receiving device or light-emitting device, a second mount portion 14 for mounting an electronic device, a connecting portion 16 (constituted by four inner lead pins) for connecting the mount portions 12 and 14 to each other electrically and mechanically, and five outer lead pins 18 positioned behind the second mount portion 14. Here, the surfaces of the first and second mount portions 12 and 14 are plated with silver.

A sub-mount member 20 is firmly attached onto the first mount portion 12 of the lead frame 10, whereas the optical device 22 formed as a semiconductor chip (bare chip) is firmly attached onto the sub-mount member 20. On the other hand, the second mount portion 14 is equipped with an electronic device for amplifying the electric signal outputted from the optical device 22 and so forth. With bonding wires, the optical device 22 and the inner lead pins 16 are connected to each other with bonding wires, and the electronic device and the outer lead pins 18 are connected to each other.

As the sub-mount member 20, a planar capacitor (DIECAP) or the like is employed. For the optical device 22, an InGaAs type PIN diode sensitive to signal light in the wavelength band of 1.3 $\mu$m or the like is used as the light-receiving device, for example. As the light-emitting device 62, a surface emission type InGaAs light-emitting diode which emits signal light in the wavelength band of 1.3 $\mu$m or a surface emission type InGaAs laser diode is used, for example. Also, the optical device 22 is formed with a minute condenser lens LNa aligned with its main surface (light-receiving surface or light-emitting surface) in terms of optical axis.

Figure 3B:
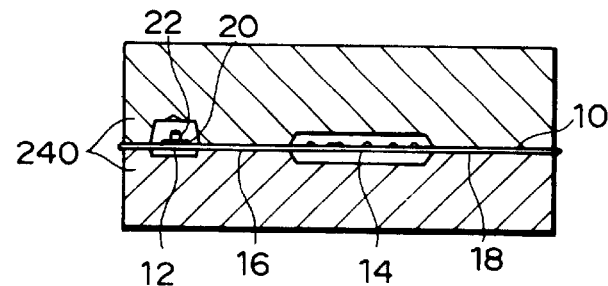

Subsequently, as shown in FIG. 3B, the lead frame 10 equipped with the optical device 22, the electronic device, and the like is accommodated in a resin-molding die 240 having a cavity with a predetermined form. Then each of the first mount portion 12 and the second mount portion 14 is transfer-molded with a resin transparent to the signal light.

Figure 3C:
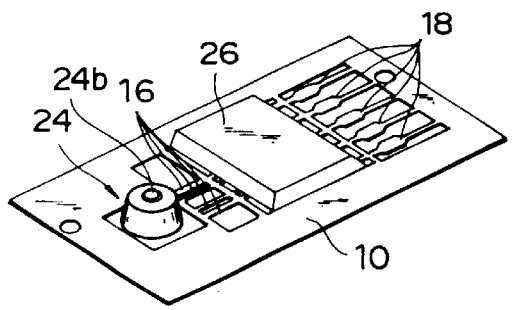

Consequently molded are, as shown in FIG. 3C, a head portion 24 (resin mold portion) in which the first mount portion 12, the sub-mount member 20, and the optical device 22 are integrally molded with the resin; and a body portion 26 (resin mold portion) in which the second mount portion 14 and the electronic device are integrally molded with the resin.

Figure 3D:
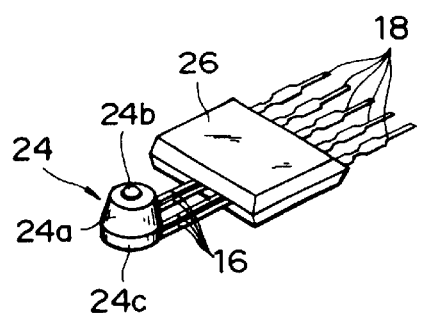

From the lead frame 10 whose predetermined parts have been molded with the resin as mentioned above, unnecessary parts are cut off, thereby an intermediate component such as that shown in FIG. 3D is yielded.

The head portion 24 thus obtained by transfer molding has a configuration in which a pedestal 24a (front end part) shaped like a circular truncated cone integrally molding the sub-mount member 20 and the optical device 22 with the resin, an aspherical lens 24b mounted to the top part of the pedestal 24a, and a base 24c shaped like a circular truncated cone or cylinder projecting to the rear side of the first mount portion 12 are integrated.

Further, the optical axes of the aspherical lens 24b and main surface (light-receiving surface or light-emitting surface) of the optical device 22 align with each other, whereas the pedestal 24a is formed into a circular truncated cone having a side wall with a predetermined angle of inclination and a predetermined height so as to be concentric with the aspherical lens 24b and the main surface of the optical device 22 and taper down toward the top part. The base 24c is shaped like a circular truncated cone tapering down from its maximum diameter at the part thereof connecting with the pedestal 24a or a cylinder having a diameter identical to that of the part connecting with the pedestal 24a.

Figure 3E:
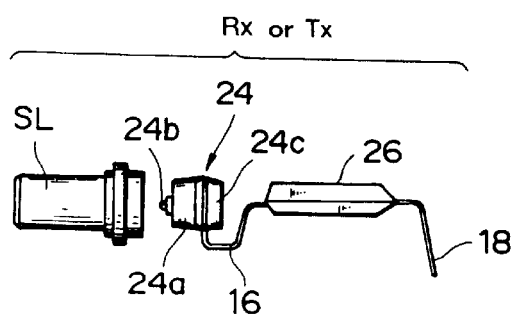

Then, as each of the inner lead pins 16 of the intermediate component obtained through the foregoing steps is bent like a hook, the aspherical lens 24b mounted to the pedestal 24a is directed opposite to the body portion 26 with respect to the inner lead pins 16. Further, as the outer lead pins 18 are bent, a SIP (single in-line package) type module such as that shown in FIG. 3E is obtained.

As a cylindrical alignment sleeve SL for receiving an optical fiber ferrule is bonded and secured to the pedestal 24a of the head portion 24, an optical module integrated with the sleeve SL is accomplished.

The present invention comprises a variety of structures enabling the workability in the operation of securing the sleeve SL and the head portion 24 to each other and their adhesion durability to improve.

First Embodiment

Figure 1:
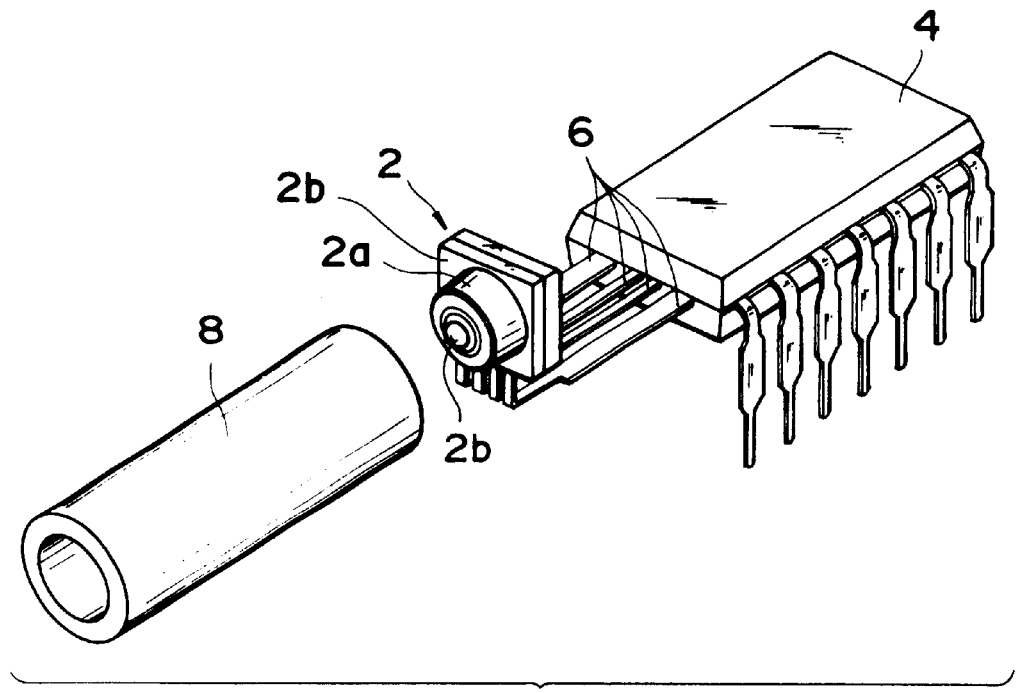
FIG. 1 is a perspective view showing the configuration of a conventional optical module.
Figure 2:
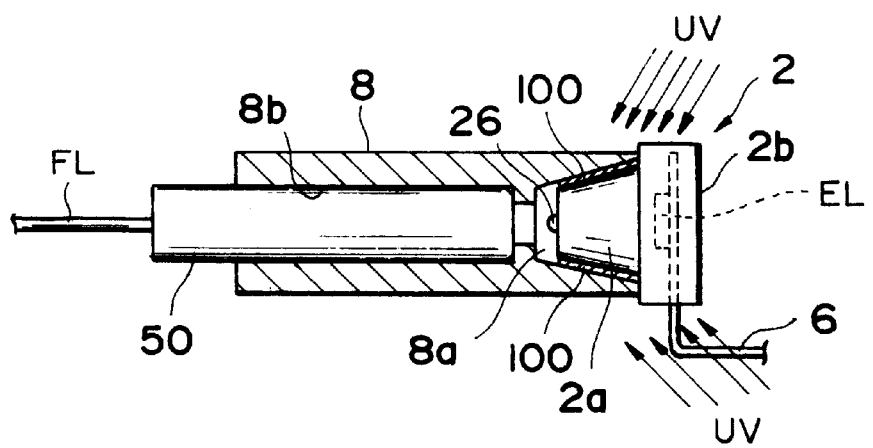
FIG. 2 is a sectional view for explaining a securing operation for a sleeve in the conventional optical module.

The step of bonding the sleeve SL and the head portion 24 in the optical module is carried out such that, as shown in FIG. 2 mentioned above, in the state where the pedestal 24a of the head portion 24 is inserted into the sleeve SL with an adhesive 450 (UV-curable resin) interposed therebetween, their optical axes are aligned with each other, and then the adhesive 450 is irradiated with ultraviolet rays UV from behind the head portion 24.

Figure 4A:
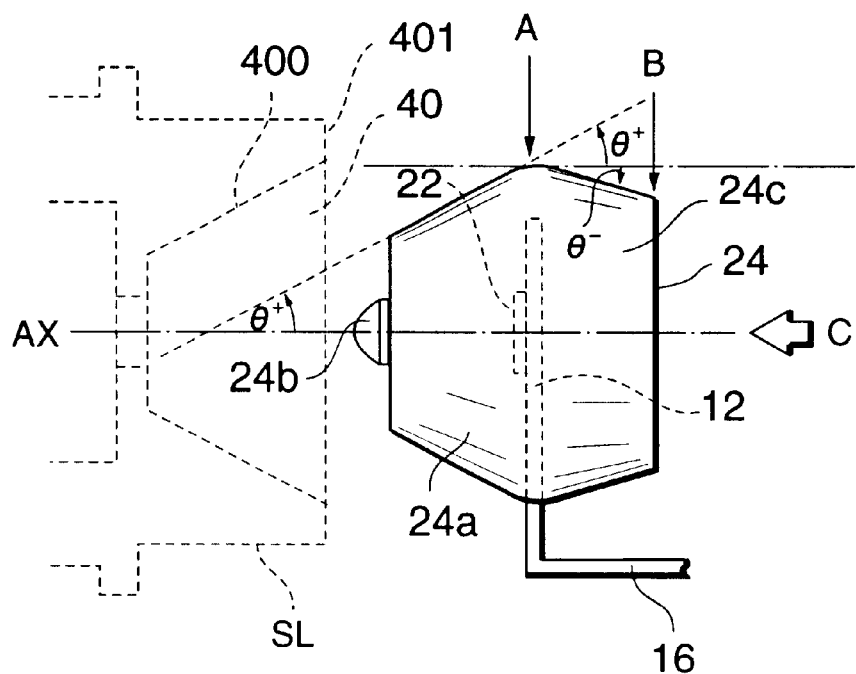

In the first embodiment of the optical module according to the present invention, as shown in FIG. 4A, the pedestal 24a, which is the part of the head portion 24 accommodated in the sleeve SL, has a side face tilted with respect to a reference axis AX by a first angle ($\theta^+ > 0$), whereas the remaining part 24c of the head portion 24 exposed from the sleeve SL has a side face tilted with respect to the reference axis AX by a second angle which is equal to or smaller than the first angle. As shown in FIG. 4A, the first and second angle are given by a positive value $\theta^+$ or negative value $\theta^-$ about the reference axis AX. Consequently, the head portion 24 would be shaped like a trapezoid when $\theta^+$ is a positive value while the second angle is equal to or smaller than the first angle, whereas it would be shaped like a barrel, as in the first embodiment, when the second angle is a negative value (and smaller than the first angle as a matter of course).

Figure 4B:
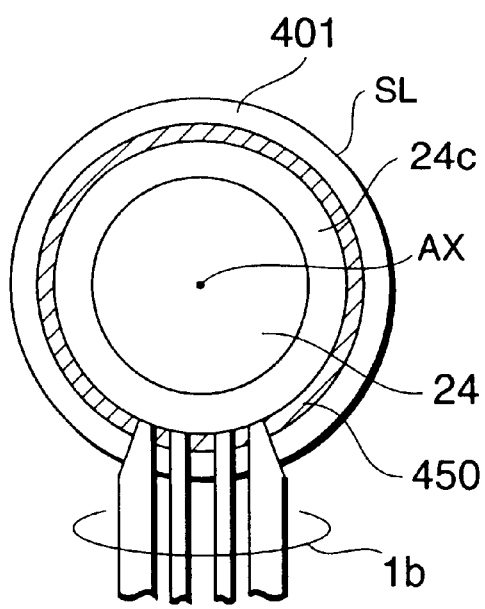

In the first embodiment, the base 24c of the head portion 24 is designed such that the cross-sectional area of the base 24c orthogonal to a predetermined reference axis AX (coinciding with the tube axis AX of the sleeve SL) is equal to or smaller than the cross-sectional area of the head portion 24 (cross-sectional area of the part indicated by the arrow A in FIG. 4A) matching the opening face of the sleeve SL. FIG. 4B is a plan view of the head portion 24 partly inserted into the sleeve SL, observed from the direction indicated by the arrow C in FIG. 4A. The head portion 24 is designed such that the maximum value of cross-sectional area of the head portion 24 orthogonal to the reference axis is smaller than the area of the opening 401 of the sleeve SL. FIG. 4B also shows the relationship in terms of magnitude among the opening 401 of the sleeve SL, cross section of the part indicated by the arrow A in FIG. 4A, and cross section of the part (corresponding to the bottom face 241 of the base 24c) indicated by the arrow B in FIG. 4A.

Thus, in the optical module according to the first embodiment, since the base 24c of the head portion 24 is designed so as to have a cross-sectional area equal to or smaller than the maximum cross-sectional area of the head portion 24 (cross section coinciding with the opening 401 of the sleeve SL in the first embodiment), the base 24c would not hinder the sleeve SL and the pedestal 24a from firmly attaching to each other with the aid of the UV-curable resin 450, thereby the UV-curable resin 450 can directly be irradiated with the ultraviolet rays UV so as to be cured securely in a short period of time. In the conventional optical module, by contrast, since the gap filled with the UV-curable resin is blocked with a part of the head portion 2, it has been impossible to keep the illuminance of ultraviolet rays from decreasing even when the head portion 2 is a resin mold body transparent to the ultraviolet rays.

Also, as shown in FIG. 4B, since the UV-curable resin 450 is applied to a side wall of the pedestal 24a at regular intervals so as to firmly attach to the inside of the sleeve SL, it would uniformly shrink among individual parts upon curing. Consequently, the sleeve SL and the head portion 24 can be aligned with each other with high accuracy.

Second Embodiment

The second embodiment of the optical module according to the present invention comprises a structure for restricting the flow of the excess part of adhesive during the securing operation for the sleeve SL.

Figure 5A:
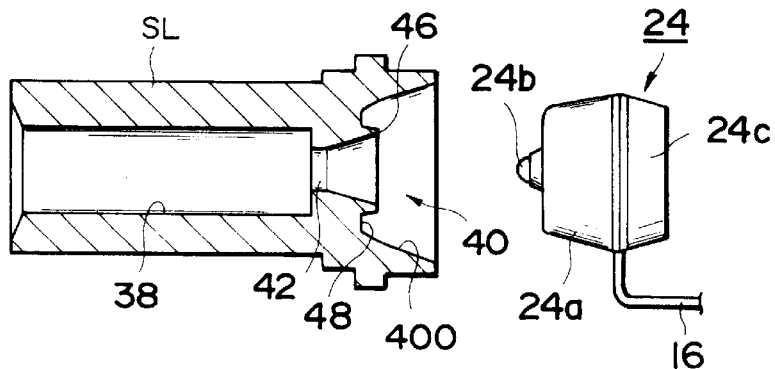
FIGS. 5A to 5D are views for explaining a securing operation for the sleeve in the second embodiment of the optical module according to the present invention.

Namely, the cylindrical sleeve SL is molded with an opaque resin, and comprises, as shown in the sectional view of FIG. 5A, an insertion hole 38 for accommodating a ferrule, an insertion hole 40 for accommodating the pedestal 24a of the head portion 24, and a through hole 42 for communicating these insertion holes 38 and 40 to each other. The through hole 40 has an inner wall face 400 shaped like a circular truncated cone substantially matching the side wall form of the pedestal 24a, while the lower part of the inner wall face 400 is formed with an annular protrusion 46 and an annular depression 48.

Figure 5B:
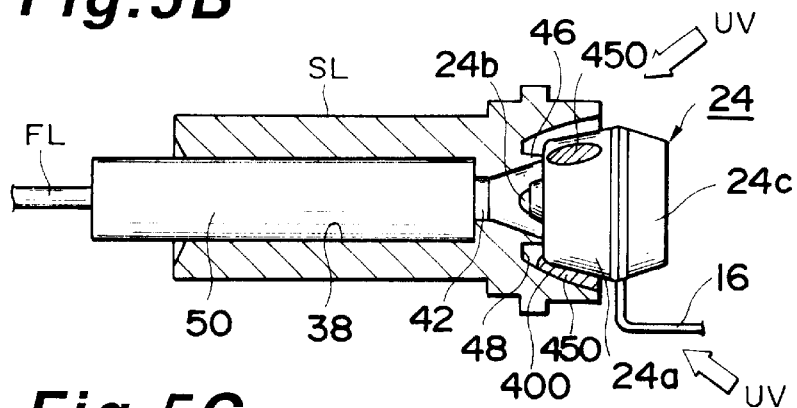
Figure 5C:
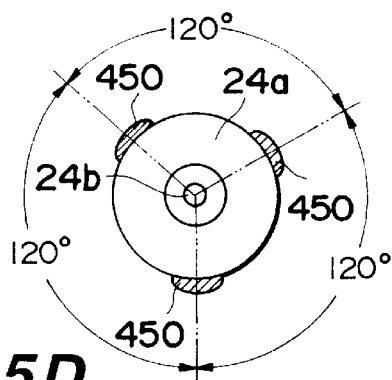

As shown in FIG. 5B, the sleeve SL and a module without the sleeve SL firmly attaching thereto are supported by an adjustment jig (not illustrated), and the module is actually operated in the state where an adjustment ferrule 50 receiving an optical fiber FL therein is inserted into the insertion hole 38 of the sleeve SL. As shown in FIG. 5C, the side wall of the pedestal 24a is coated with the UV-curable resin 450 at three locations at regular intervals. While in this state, the pedestal 24a is inserted in the insertion hole 40 of the sleeve SL.

Here, if the optical module is a receiver optical module, then the positions of the sleeve SL and head portion 24 are adjusted (for optical axis alignment) such that the output signal (electric signal) corresponding to the signal light introduced in the optical fiber FL becomes a predetermined level or higher. If the optical module is a transmitter optical module, on the other hand, then the positions of the sleeve SL and head portion 24 are adjusted (for optical axis alignment) such that, with the signal light emitted from the optical module being introduced into the optical fiber FL, the intensity of the signal light taken out from the optical fiber FL becomes a predetermined level or higher. Such optical axis alignment is similarly carried out in the first embodiment as well.

After the optical axis alignment, the UV-curable resin 450 is irradiated with the ultraviolet rays UV from obliquely behind the head portion 24, so as to be cured.

Figure 5D:
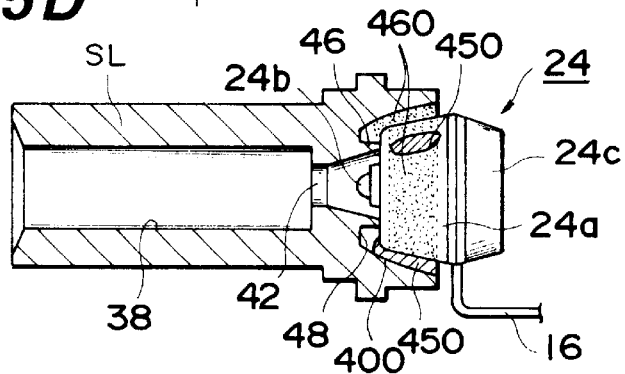

Subsequently, as shown in FIG. 5D, with a thermosetting resin 460 such as one-component adhesive being injected into the gap between the inner wall face 400 of the insertion hole 40 and the side wall of the pedestal 24a, heating is carried out, so that the sleeve SL and the head portion 24 are more firmly attached to each other. Here, upon heating, the thermosetting resin 460 may temporarily lower its viscosity and flow into the lower part of the insertion hole 40 due to the capillary action. Since it is held in the depression 48 defined by the protrusion 46 and the inner wall face 400 of the insertion hole 40, the thermosetting resin 460 can securely be inhibited from adhering to the aspherical lens 24b, the communication hole 42, and the insertion hole 38.

Thus, in the second embodiment, since the bottom part (deep part) of the insertion hole 40 in the sleeve SL is provided with the depression 48 for reserving the thermosetting resin 460, the depression 48 can act as a restriction structure for preventing the excess thermosetting resin from unnecessarily spreading out, thereby the optical module is allowed to exhibit its inherent optical characteristics.

Figure 6:
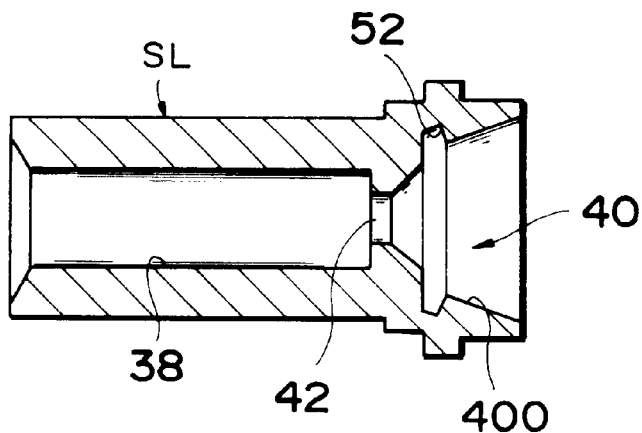
FIG. 6 is a sectional view for explaining a modified example of the sleeve in the optical module according to the second embodiment.

FIG. 6 is a sectional view for explaining a modified example of the sleeve in the optical module according to the second embodiment. As shown in FIG. 6, an annular depression 52 may be formed along the inner wall face 400 on the bottom part (deep part) side of the insertion hole 40 of the cylindrical sleeve SL. In this structure, as with the structure shown in FIG. 5A or the like, if the viscosity of the thermosetting resin 460 injected into the gap between the pedestal 24a of the head portion 24 and the insertion hole 40 decreases upon heating, the thermosetting resin 460 will be held within the depression 52, so as to be prevented from adhering to the aspherical lens 24b, the communication hole 42, and the insertion hole 38.

Also, for enhancing the bonding strength between the pedestal 24a of the head portion 24 and the sleeve SL, they can firmly be attached to each other by means of an epoxy type two-component adhesive which cures at room temperature and an epoxy type one-component adhesive which cures upon heating. The bonding step in this case will be explained in the following with reference to FIGS. 7A and 7B.

Figure 7A:
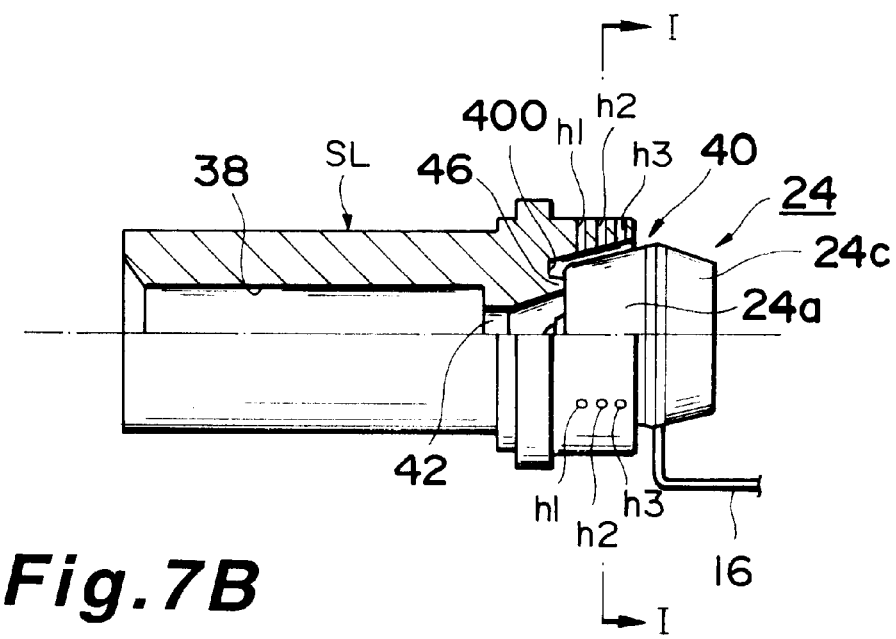
Figure 7B:
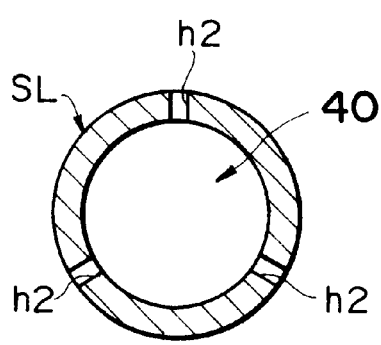

In FIG. 7A, the part of the sleeve SL provided with the insertion hole 40 has already been formed with a plurality of through hole groups arranged at regular intervals along the longitudinal axis. Each through hole group includes a plurality of through holes arranged at regular intervals along the circumferential direction. For example, as shown in FIG. 7B, the sleeve SL is formed with three through holes h2. These three holes h2 are arranged equidistantly around the periphery of the sleeve SL, while each being orthogonal to the tube axis direction (longitudinal direction) of the sleeve SL. Similarly, the other through hole groups are disposed on the bottom side and opening side of the insertion hole 40 holding the through holes h2 therebetween, while including three through holes h1 and three through holes h3, respectively.

In this modified example, as with the bonding step shown in FIG. 5D, the pedestal 24a of the head portion 24 is once bonded with the UV-curable resin 450 in the state inserted in the through hole 40. Subsequently, the two-component adhesive is injected through the three through holes h2 formed at the center part, whereas the one-component adhesive is injected through the three through holes h1 and the three through holes h3 disposed on the bottom side and opening side of the insertion hole 40, respectively. of course, the two-component adhesive and one-component adhesive are sufficiently injected until they reach the side wall of the pedestal 24a.

After thus injected two-component adhesive is cured at room temperature, the injected one-component adhesive is cured upon heating.

In this bonding step, a very high bonding strength is obtained due to the one-component adhesive. If the one-component adhesive were used alone, however, there would be a possibility of the already cured UV-curable resin 450 softening. In such a case, there is a risk of the adjusted optical axis shifting. Therefore, steps of reinforcing the bonding strength of the UV-curable resin 450 with the two-component adhesive curing at room temperature, and then securing the final strength with the two-component adhesive acting as the thermosetting resin 460 are employed, thereby it is possible to attain the improvement in accuracy of optical axis adjustment between the sleeve SL and head portion 24 and the improvement in bonding strength at the same time.

When injected through the through holes h1 to h3 as mentioned above, the two-component adhesive and one-component adhesive would be applied to the side wall of the pedestal 24a substantially equidistantly so as to correspond to the respective positions of the through holes h1 to h3. As a consequence, each adhesive uniformly shrinks upon curing, thereby the adjusted optical axis would not shift.

Also, in the case where such a bonding method is carried out, providing the through hole 40 with any of the resin-reserving depressions 44 and 52 shown in FIGS. 5A and 6 can prevent the two-component adhesive or one-component adhesive from unnecessarily spreading out.

Though the depressions 48 and 52 are annular grooves continuous along the inner wall face 400 of the through hole 40 in the second embodiment as shown in FIGS. 5A to 5D and 6, the second embodiment should not be restricted thereto. Namely, the resin-reserving effect can also be obtained when at least one groove is partly (intermittently) disposed along the inner wall face 400 of the insertion hole 40, so as to act as the depression 48, 52. The bonding method using the UV-curable resin and thermosetting resin as mentioned above is applicable to the first embodiment as well.

Figure 8A:
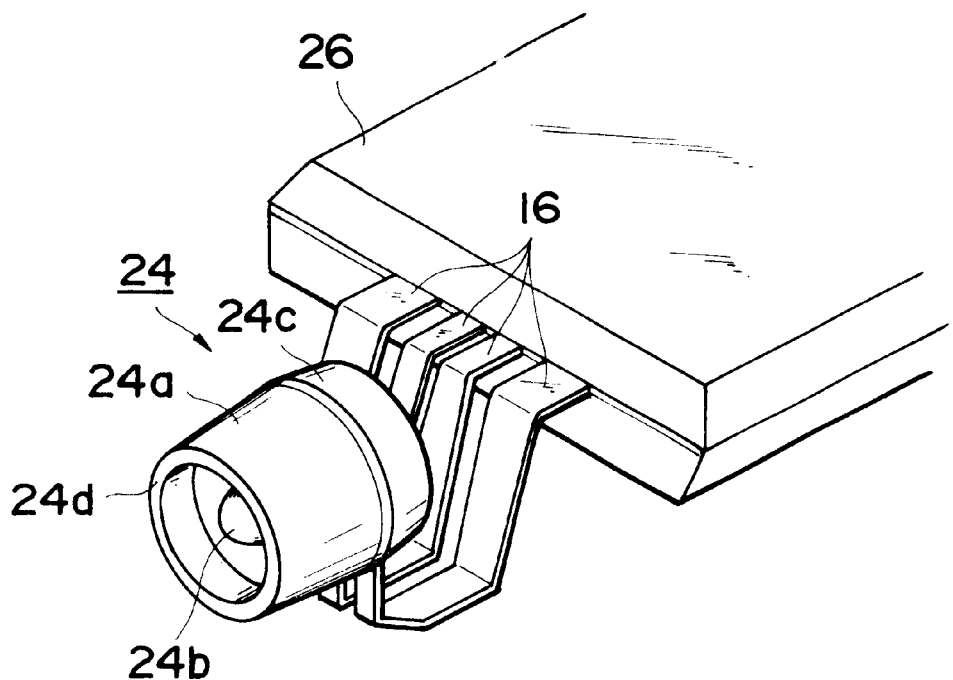
Figure 8B:
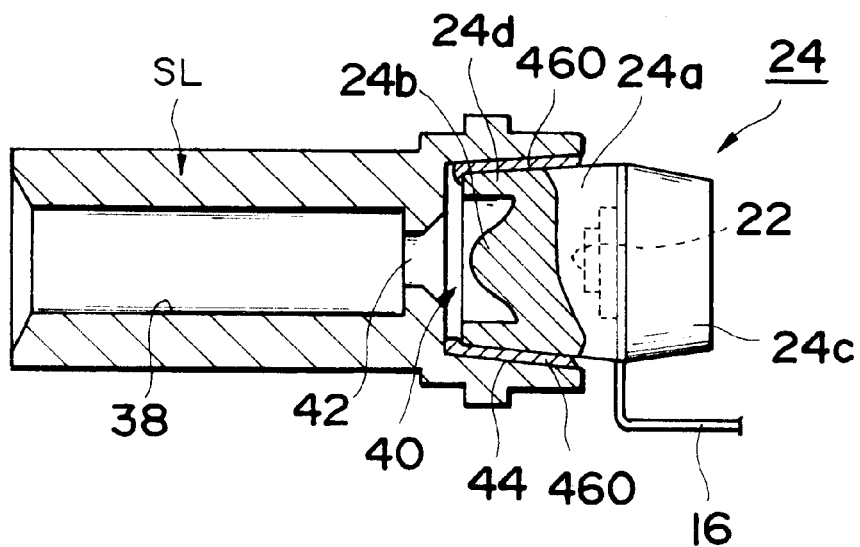
Figure 9A:
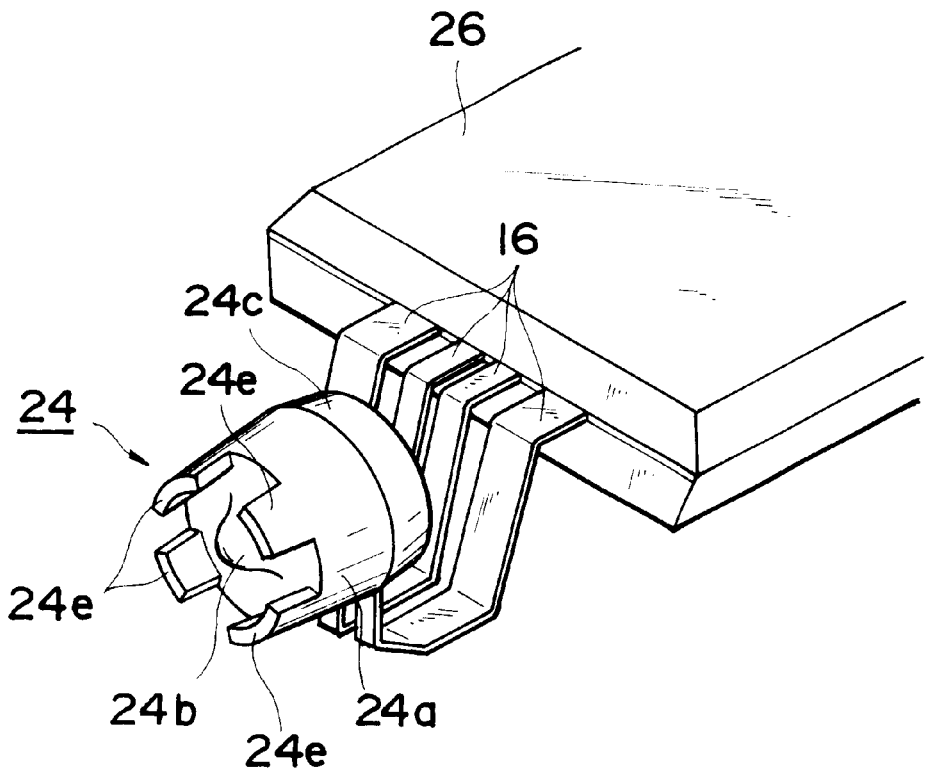
Figure 9B:
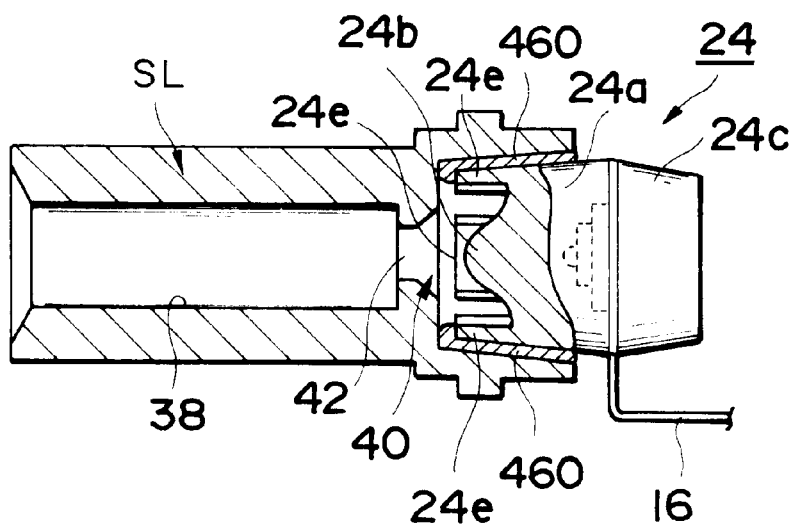

Applied examples of the optical module according to the second embodiment will now be explained with reference to FIGS. 8A to 9B. FIGS. 8A and 8B are views for explaining the first applied example of the optical module according to the second embodiment, in which FIG. 8A is a perspective view for explaining the head portion of the optical module, whereas FIG. 8B is a sectional view showing the state of bonding between the sleeve and the head portion shown in FIG. 8A. FIGS. 9A and 9B are views for explaining the second applied example of the optical module according to the second embodiment, in which FIG. 9A is a perspective view of the head portion of the optical module, whereas FIG. 9B is a sectional view showing the state of bonding between the sleeve and the head portion shown in FIG. 9A.

In FIG. 8A, the pedestal 24a of the head portion 24 is integrally molded with a hollow cylindrical wall part 24d so as to surround the aspherical lens 24b. The wall part 24d is molded at the same time when the head portion 24 is transfer-molded with a resin-molding die, and has such a shape that it can be accommodated in the through hole 40 of the sleeve SL.

In order for the sleeve SL to be bonded and secured to the head portion 24, the pedestal 24a coated with the UV-curable resin 450 is fitted into the through hole 40 of the sleeve SL as shown in FIG. 5B, their optical axes are aligned with each other, and then the UV-curable resin 450 is cured upon irradiation with ultraviolet rays.

Then, as shown in FIG. 8B, the thermosetting resin 460 such as one-component adhesive is injected into the gap between the inner wall face 400 of the through hole 40 and the side wall of the pedestal 24a. Upon heating, the thermosetting resin 460 firmly bonds the sleeve SL and the head portion 24 together.

Here, upon heating, the thermosetting resin 460 may temporarily lower its viscosity and flow into the bottom part of the though hole 40 due to the capillary action. In the first applied example, however, this flow is blocked by the hollow cylindrical wall part 24d surrounding the aspherical lens 24b, which constitutes a structure capable of securely inhibiting the thermosetting resin 460 from adhering to the aspherical lens 24b, the communication hole 42, and the insertion hole 38.

As explained above, by continuously surrounding the aspherical lens 24b with the wall part 24d, the first applied example forms a structure for inhibiting the thermosetting resin 460 from unnecessarily spreading out. As shown in FIG. 9A, on the other hand, the pedestal 24a may be integrally molded with a plurality of protruded wall parts 24e at predetermined intervals, so as to surround the aspherical lens 24b (second applied example).

In the second applied example, as shown in FIG. 9B, the thermosetting resin 460 is injected into the gap between the through hole 40 of the sleeve SL and the pedestal 24a. Even if the once-injected thermosetting resin 460 lowers its viscosity upon heating, it will be held within the gaps between the wall parts 24e due to the capillary action, so as to be securely inhibited from adhering to the aspherical lens 24b, the communication hole 42, and the insertion hole 38.

In the first and second applied examples, the pedestal 24a of the head portion 24 is simply provided with the continuous wall part 24d or a plurality of protruded wall parts 24e disposed at predetermined intervals, so as to constitute a structure for inhibiting the thermosetting resin 460 from unnecessarily spreading out. The sleeve SL having any of the depression 48 and 52 shown in FIGS. 5A to 5D and 6, however, may be employed in these applied examples as well.

Also, the sleeve SL having a configuration shown in FIGS. 7A and 7B (in which a plurality of through holes are formed on the insertion hole 40 side of the sleeve SL) may be employed in each of the above-mentioned applied examples such that the two-component adhesive and the one-component adhesive are injected therethrough.

Third Embodiment

The third embodiment of the optical module according to the present invention has a structure for enhancing the bonding strength between the head portion 24 and the sleeve SL secured to each other with an adhesive interposed therebetween, at least one of the head portion 24 and the sleeve SL being provided with this structure.

Figure 10A:
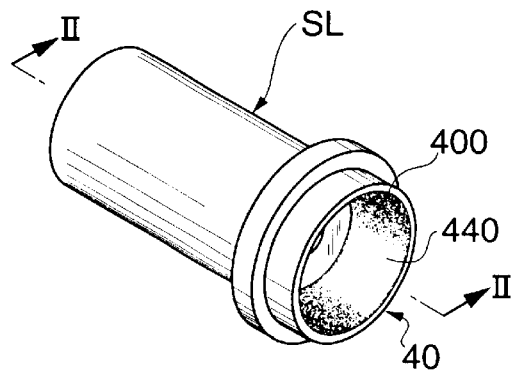
Figure 10B:
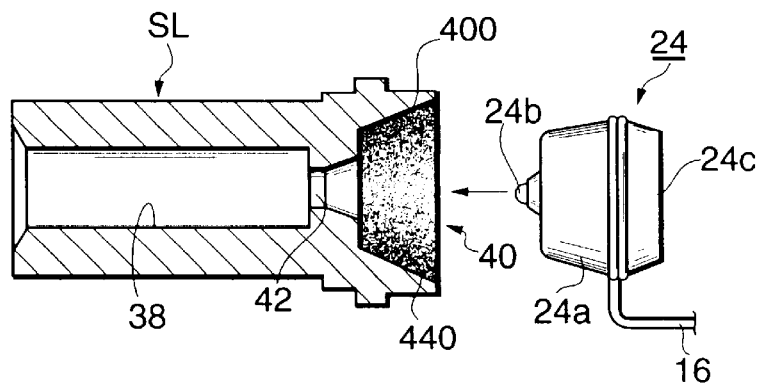
Figure 10C:
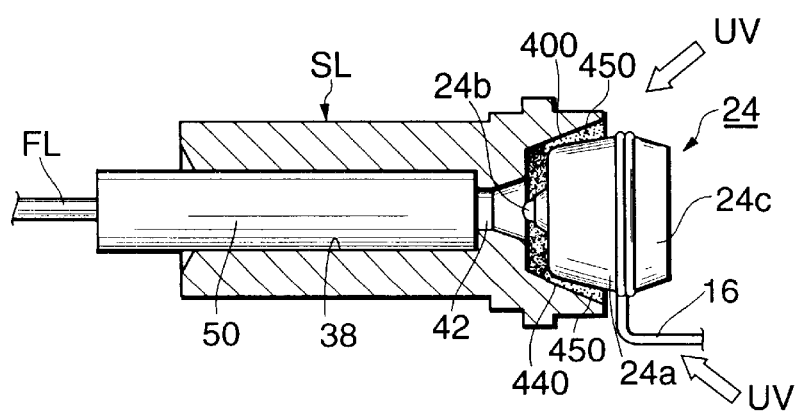

FIGS. 10A to 10C are views showing the configuration of the optical module according to the third embodiment and the step of bonding the head portion 24 and the sleeve SL together. In the third embodiment, the inner wall of the sleeve SL or the surface of the insertion part of the head portion 24 is subjected to predetermined surface processing, so as to enhance the bonding strength between the sleeve SL and the head portion 24.

As shown in FIGS. 10A and 10B, the sleeve SL is a hollow cylindrical member comprising a space 38 (insertion hole) for accommodating an optical fiber ferrule, and a space 40 (insertion hole) for accommodating the pedestal 24a of the head portion 24. In the third embodiment, in particular, the inner wall face 400 of the sleeve SL mating with the pedestal 24a is formed with embossment 440, for example, as a result of the surface processing. The sleeve SL is secured to the head portion 24 such that the embossed surface 400 faces the surface of the pedestal 24a with an adhesive interposed therebetween. Namely, the cylindrical sleeve SL is molded with an opaque resin and comprises, as shown in FIG. 10B, the insertion hole 38 for inserting the ferrule from the front end side, the insertion hole 40 for inserting the pedestal 24a of the head portion 24 from the rear end part, and a communication hole 42 for communicating the insertion holes 38 and 40 to each other. The insertion hole 40 has the inner wall face 400 shaped like a circular truncated cone substantially matching the side wall form of the pedestal 24a.

The step of bonding the sleeve SL and the head portion 24 is carried out in the state where they are supported with their respective adjustment jigs (not illustrated). Namely, the optical module is actually operated in the state where the pedestal 24a is inserted into the insertion hole 40 of the sleeve SL with the adhesive 450 made of a UV-curable resin interposed therebetween, while an adjustment ferrule 50 receiving an optical fiber FL is inserted in the insertion hole 38 of the sleeve SL.

Here, if the optical module is a receiver optical module, then the positions of the sleeve SL and head portion 24 are adjusted (for optical axis alignment) such that the output signal (electric signal) corresponding to the signal light introduced in the optical fiber FL becomes a predetermined level or higher. If the optical module is a transmitter optical module, on the other hand, then the positions of the sleeve SL and head portion 24 are adjusted (for optical axis alignment) such that, with the signal light emitted from the optical module being introduced into the optical fiber FL, the intensity of the signal light taken out from the optical fiber FL becomes a predetermined level or higher.

After the optical axis alignment, the ultraviolet rays UV irradiate the space between the inner wall face of the sleeve SL and the surface of the pedestal 24a from obliquely behind the head portion 24, so as to solidify the UV-curable resin 450, thereby the sleeve SL and the head portion 24 are secured to each other. Here, as with the second embodiment, the UV-curable resin and a thermosetting resin can be used in combination in the third embodiment as well.

In the third embodiment, the inner wall face 400 of the sleeve SL or the surface of the pedestal 24a of the head portion 24 is subjected to surface processing so as to form a desirable irregularity pattern thereon as mentioned above. In the following, a method of making (transfer-molding) the sleeve SL in which the embossment 440 is formed on the inner wall face 400 of the sleeve SL will be explained with reference to FIGS. 11A and 11B.

Figure 11A:
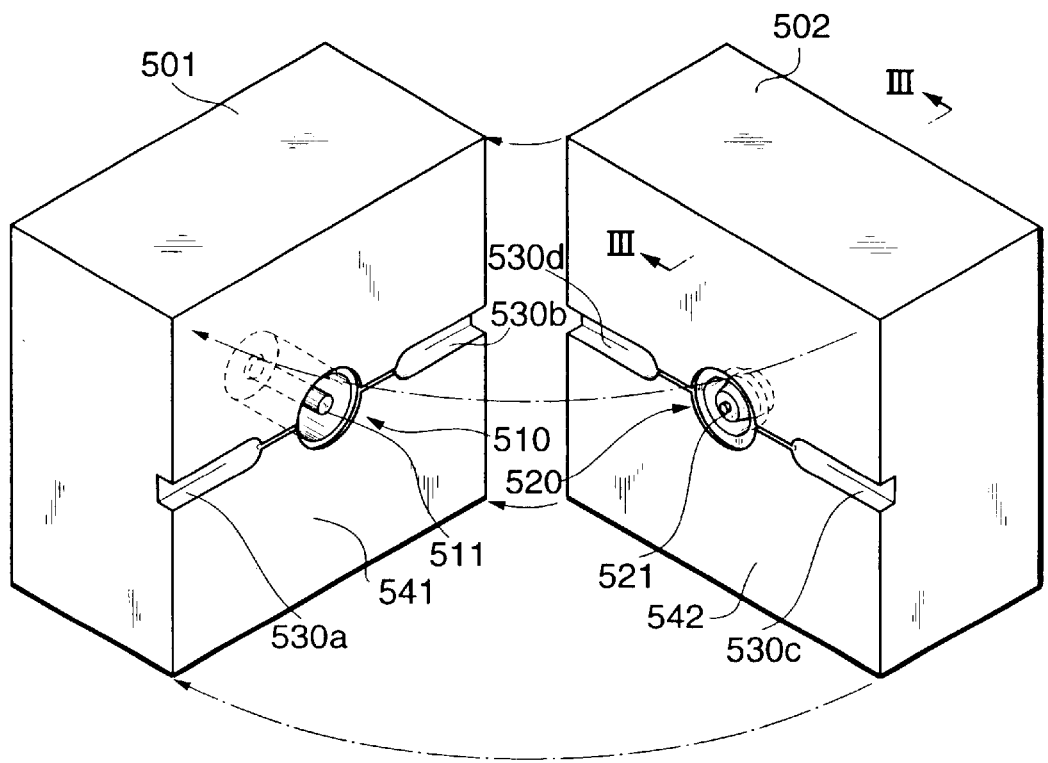

First, dies 501, 502 for making an opaque resin sleeve are prepared. As shown in FIG. 11A, these dies 501, 502 are formed with cavities 510, 520 for defining the shape of the sleeve SL, respectively; whereas rod members 511, 521 for forming the insertion holes 38, 40 are installed in the cavities 510, 520, respectively. Surfaces 541, 542 of the dies 501, 502 are formed with grooves 530a to 530b so as to form an injection hole for a plastic resin when the dies 501, 502 are assembled together such that the surfaces 541 and 542 mate with each other.

Figure 11B:
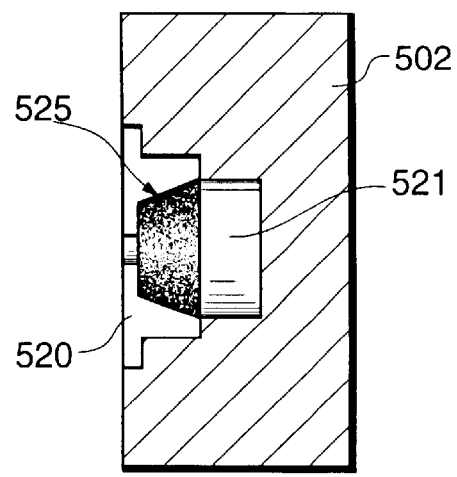
FIG. 11B is a sectional view of a die taken along the III—III line in FIG. 11A.

Specifically, as shown in FIG. 11B, within the die 502 for molding the head portion 24 side of the sleeve SL, the rod member 521 formed with an embossed pattern 525 on its surface (matching the inner wall face of the sleeve mating with the pedestal 24a of the head portion 24) is installed. As a consequence, the embossed pattern 525 of the rod member 521 is transferred onto the inner wall face 400 of the sleeve SL.

Figure 12A:
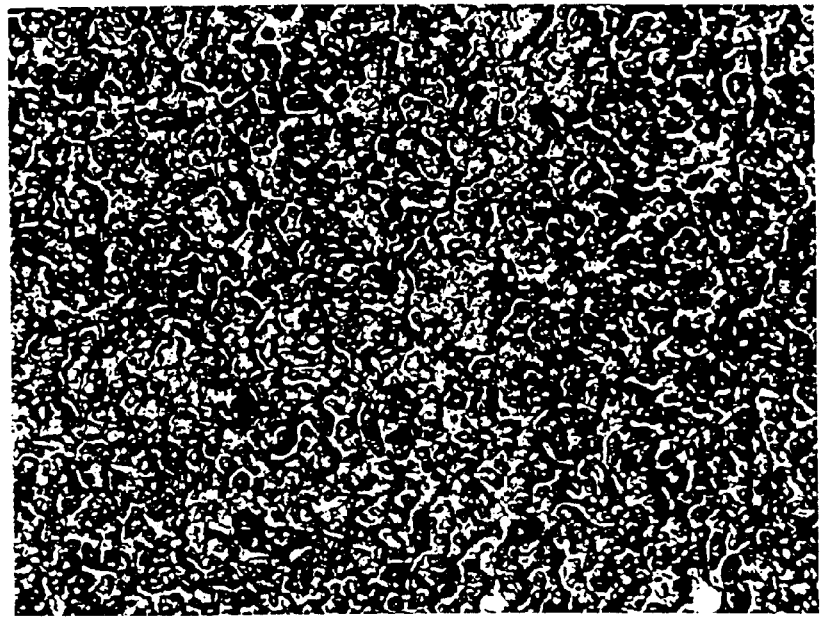
FIGS. 12A and 12B are microscope photographs showing the embossment formed on the inner wall face of the sleeve shown in FIG. 10A, observed at magnifications of 100× and 200×, respectively.
Figure 12B:
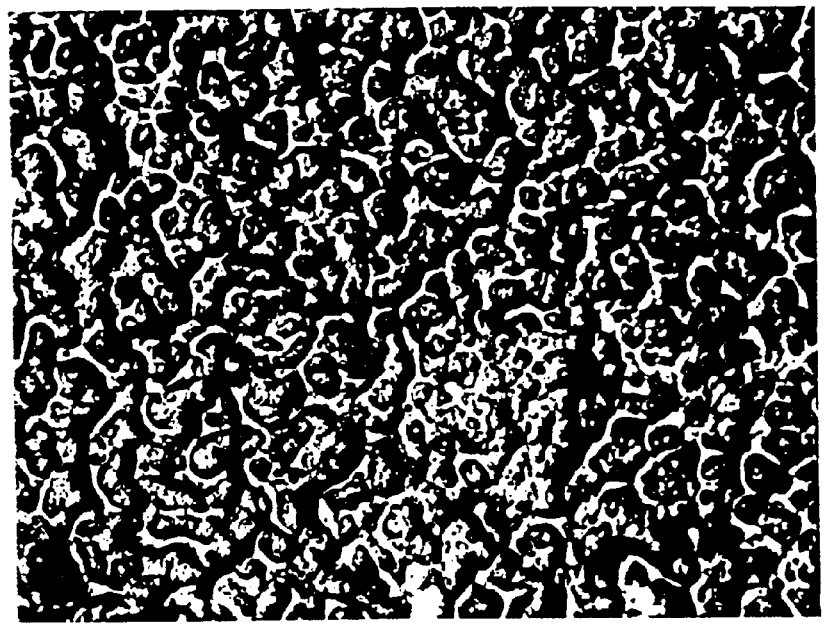

FIGS. 12A and 12B are microscope photographs showing the inner wall face 400 (embossed surface) of the sleeve SL molded by means of the above-mentioned dies 501, 502. Here, FIGS. 12A and 12B show the embossed surface formed in the sleeve SL observed at magnifications of 100× and 200×, respectively.

As the adhesive pervades the embossed surface 400, thus formed embossment 440 enhances the bonding strength between the sleeve SL and the resin mold portion (pedestal 24a). The embossment 440 is constituted by a plurality of depressions having a maximum depth of about 10 μm, preferably within the range of 10 μm to 20 μm. It is due to the fact that a sufficient bonding strength may not be obtained when the depressions are too shallow, whereas the sleeve SL and the like may not be pulled out of the die after the resin molding when the depressions are too deep. The bonding strength between the sleeve SL and head portion 24 depends not only on the depth of the depressions constituting the embossment 440 but also on the form of the embossed surface 400. As a consequence, the embossment 440 formed in the optical module according to the third embodiment in order to attain a desirable bonding strength is constituted by a plurality of depressions having a maximum diameter of 20 μm to 50 μm, while the depressions constituting the embossment 440 occupy about 80%, preferably 60% to 90%, of the embossed surface 400.

Though the foregoing explanation of the third embodiment relates to the method of making the sleeve SL for forming the embossment 440 on the inner wall face 400 of the sleeve SL facing the pedestal 24a of the head portion 24, the surface of the pedestal 24a may be formed with the embossment 440 as well. Also, instead of providing the inner wall face 400 and/or the surface of the pedestal 24a with the embossment 440, a protrusion pattern having a predetermined height may be formed on the sleeve SL or the pedestal 24a by etching or the like after transfer molding.

A first applied example of the optical module according to the third embodiment will now be explained with reference to FIGS. 13A and 13B. Here, FIG. 13A is a perspective view of the sleeve SL in the first applied example, whereas FIG. 13B is a sectional view, taken along the IV—IV line in FIG. 13A, for explaining an operation for securing the sleeve SL.

Figure 13A:
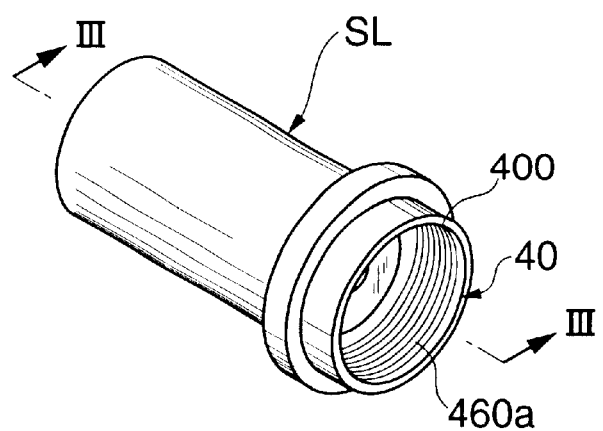
Figure 13B:
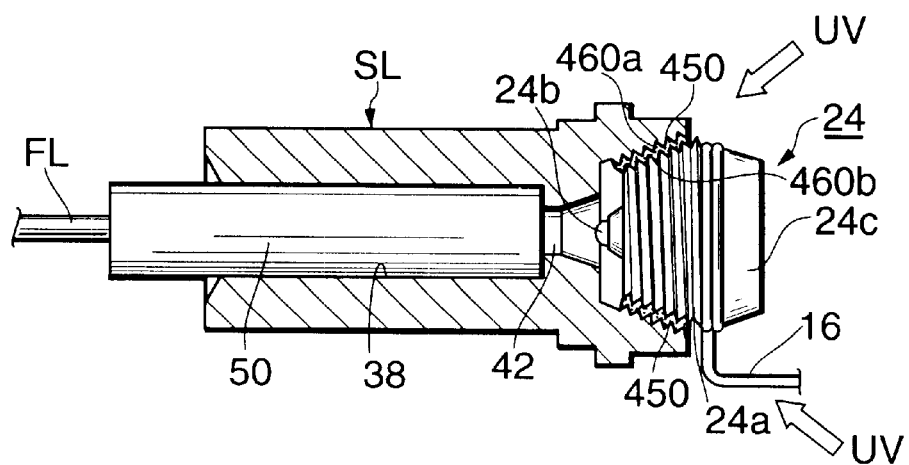

In the first applied example, as shown in FIG. 13A, a thread groove 460a is formed on the inner wall face 400 of the sleeve SL adapted to face the surface of the pedestal 24a in the head portion 24 when bonded and secured to the head portion 24. As the adhesive 450 such as UV-curable resin pervades the thread groove 460a, the bonding strength between the sleeve SL and the head portion 24, which is a resin mold portion, enhances.

The step of bonding the sleeve SL and the head portion 24 to each other is carried out by means of a UV-curable resin as shown in FIG. 10C or by means of the UV-curable resin and a thermosetting resin as with the second embodiment. Here, when the surface of the pedestal 24a of the head portion 24 is also provided with a thread groove 460b so as to engage the screw groove 460a formed in the sleeve SL, then the positional relationship between the sleeve SL and the head portion 24 can be defined accurately. Namely, this optical axis adjustment is carried out in the state where an adjustment ferrule 50 receiving an optical fiber FL is inserted in the insertion hole 38 of the sleeve SL, while the pedestal 24a of the head portion 24 is inserted in the sleeve SL such that the thread groove 460b thereof engages the thread groove 460a of the sleeve SL. As a consequence, the optical axis adjustment is carried out while monitoring the signal intensity in the case of the receiver optical module or the output light intensity from the optical fiber FL in the case of the transmitter optical module. In this configuration, the distance between the optical fiber FL and the light-receiving surface of the optical device within the head portion 24 can easily be adjusted and maintained.

A second applied example of the optical module according to the third embodiment will now be explained with reference to FIGS. 14A and 14B. Here, FIG. 14A is a perspective view of the sleeve SL in the first applied example, whereas FIG. 14B is a sectional view, taken along the V—V line in FIG. 14A, for explaining an operation for securing the sleeve SL.

Figure 14A:
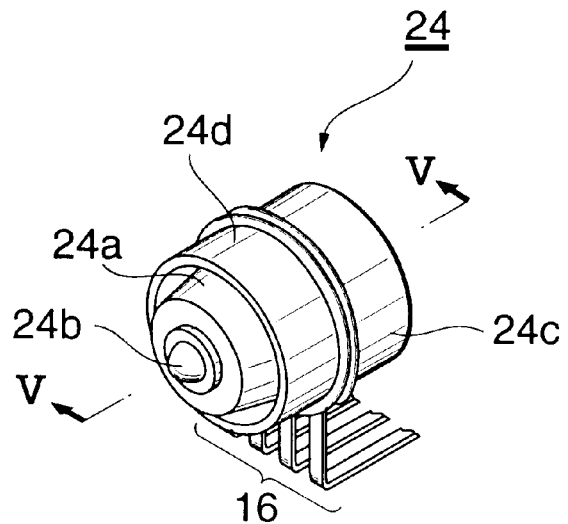
Figure 14B:
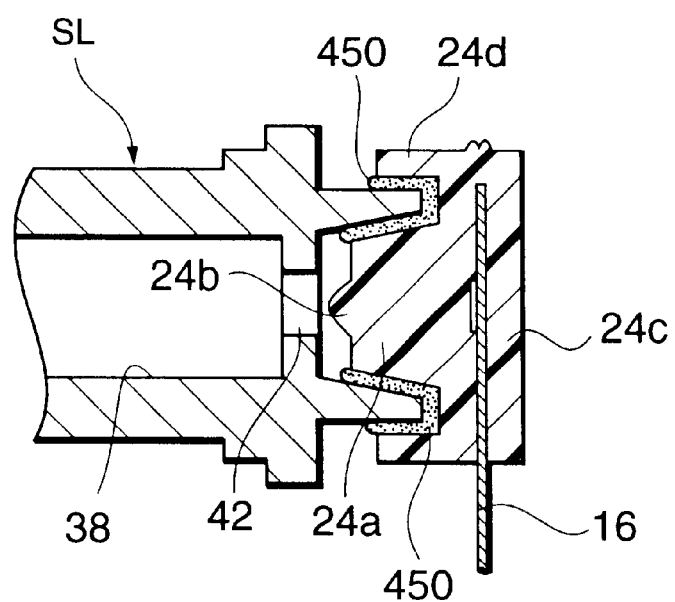

In the second applied example, as shown in FIG. 14A, the head portion 24 comprises not only a pedestal 24a (first protrusion) bonded and secured to the sleeve SL, in the state accommodated therein, with an adhesive 450 interposed therebetween, but also a reinforcement 24d (second protrusion). As a consequence, when the head portion 24 having such a configuration as that shown in FIG. 14A (second applied example) and the sleeve SL are secured to each other with the adhesive 450 interposed therebetween as shown in FIG. 14B, then the opening part of the sleeve SL is held between the pedestal 24a and the reinforcement 24d. Here, since the gap between the outer peripheral surface of the sleeve SL and the reinforcement 24d and the gap between the pedestal 24a and the inner wall face 400 of the sleeve SL are filled with the adhesive 450, the bonding areas in the sleeve SL and head portion 24 are about twice as large as those conventionally available, thereby the third embodiment can enhance the bonding strength between the sleeve SL and the head 24 as well.

While each of the structures (FIGS. 10A and 10B, 13A and 13B, and 14A and 14B) shown in the third embodiment enables the bonding strength to enhance, the adhesion durability can further be improved when these structures are arbitrarily combined together. Also, desirable effects can be obtained when the first to third embodiments are arbitrarily combined together.

Figure 15A:
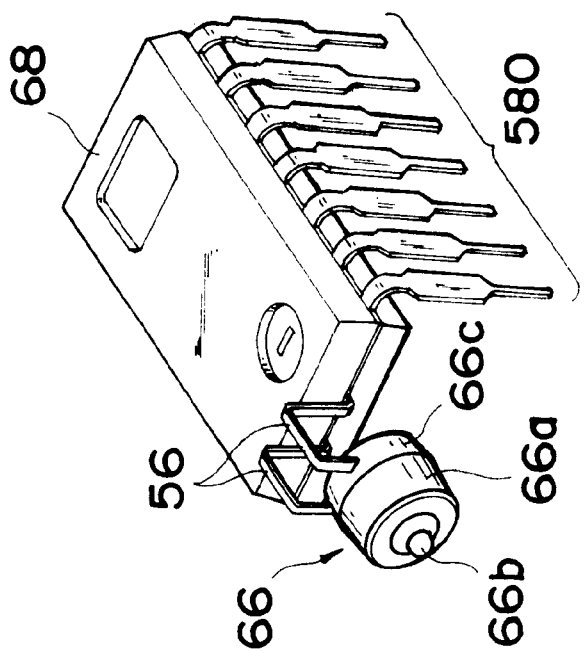
Figure 15B:
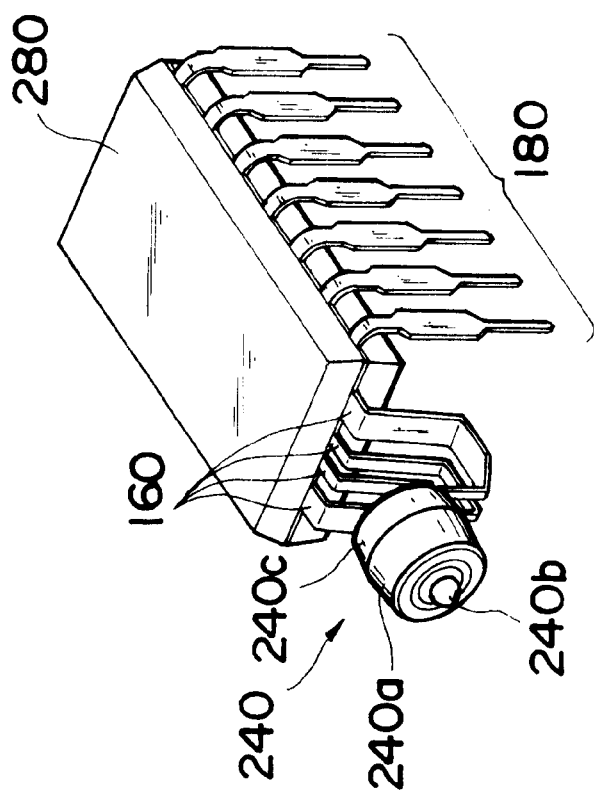
FIG. 15B is a perspective view showing an applied example of a transmitter optical module.

Though the above-mentioned optical module, whether the receiver optical module Rx or the transmitter optical module Tx, is explained as a SIP type optical module in which the outer lead pins 18 are arranged in a single line, the optical module according to the present invention should not be restricted thereto. Namely, the present invention is also applicable to DIP (dual in-line package) type optical modules such as those shown in FIGS. 15A and 15B. Here, FIGS. 15A and 15B are perspective views showing the main parts of receiver and transmitter optical modules, respectively. The receiver optical module having DIP type lead pins shown in FIG. 15A comprises a head portion 240 (including a pedestal 240a, an aspherical lens 240b, and a base 240c) which is a resin mold body, a body portion 280 molding an electronic device and the like with a resin, a connecting portion 160 for connecting these resin mold portions 240 and 280 to each other, and outer lead pins 180 extending from both sides of the body portion 280. The transmitter optical module having DIP type lead pins shown in FIG. 15B comprises a head portion 66 (including a pedestal 66a, an aspherical lens 66b, and abase 66c) which is a resin mold body, a body portion 68 molding an electronic device and the like with a resin, a connecting portion 56 for connecting these resin mold portions 66 and 68 to each other, and outer lead pins 580 extending from both sides of the body portion 68.

Figure 16:
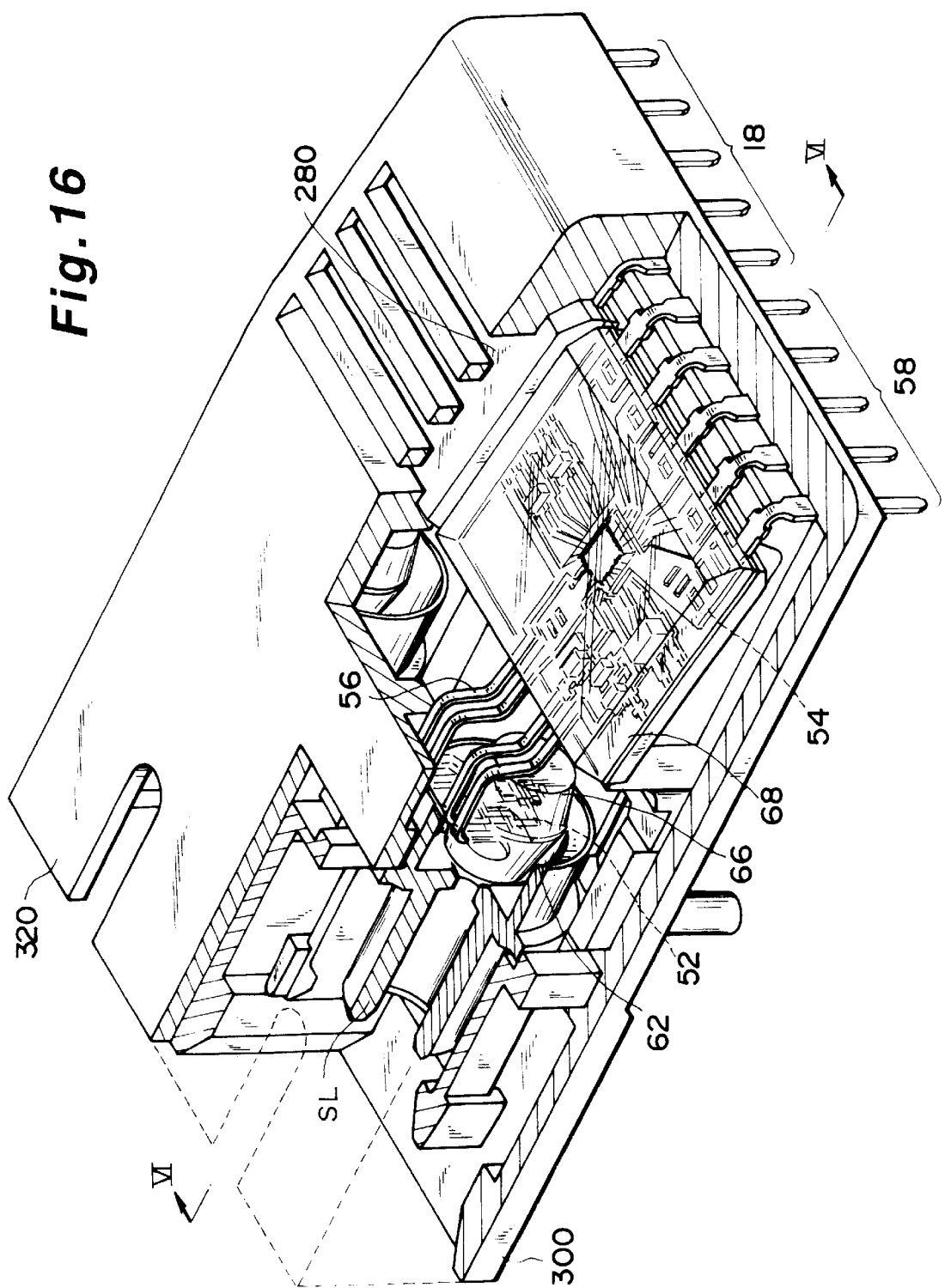
FIG. 16 is a partly fragmentary view showing an inner configuration of an optical data link to which optical modules (receiver optical module and transmitter optical module) according to the present invention are applied.
Figure 17:
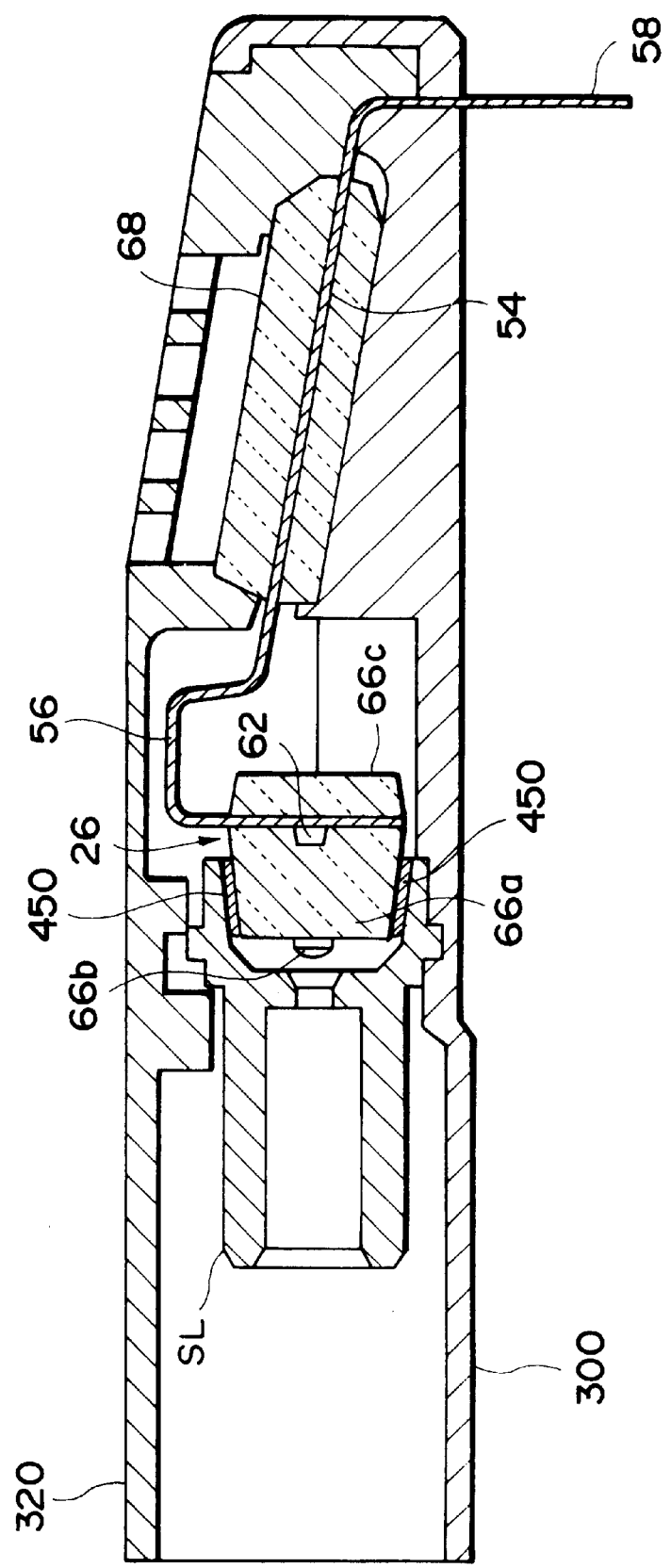
FIG. 17 is a sectional view showing the configuration of the optical data link taken along the VI—VI line in FIG. 16.

Thus manufactured optical modules (receiver and transmitter optical modules) are mainly employed in an optical data link for coupling an optical fiber transmission line and an electric signal transmission line to each other. FIG. 16 is a partly fragmentary view showing the inner configuration of the optical data link employing the optical modules (receiver and transmitter modules) according to the present invention. FIG. 17 is a sectional view showing the configuration of the optical data link taken along the VI—VI line in FIG. 16.

As can be seen from FIGS. 16 and 17, the transmitter and receiver optical modules each having a sleeve bonded and secured to its head portion are installed on a support 300 and is covered with an upper housing 320. The support 300 and the upper housing 320 are configured such that, at the same time when the upper housing 320 is mounted to the support 300, the receiver and transmitter optical modules are installed at their predetermined positions within the inner space defined by these members 300, 320. In FIGS. 16 and 17, the depicted transmitter optical module (having basically the same configuration as that shown in FIG. 15B) comprises SIP type outer lead pins 58.

As explained in the foregoing, in the present invention, since the rear end part of the head portion formed by molding an optical device with a resin is processed into a shape which does not block ultraviolet irradiation, the UV-curable resin filling the space between the cylindrical sleeve and the head portion can directly be irradiated with ultraviolet rays, so as to be cured. As a consequence, the UV-curable resin can securely be solidified in a short period of time, so that the sleeve and the mold portion are integrated together.

Also, since at least the sleeve or head portion is provided with a restriction structure for restricting the flow of adhesive, of the adhesive filling the sleeve and the head portion, the flow of excess adhesive can be blocked in the present invention. As a consequence, the excess adhesive can be prevented from adhering to locations other than where the sleeve and the head portion are to be bonded together.

Further, since a structure for enhancing the bonding strength between the sleeve and the head portion secured to each other with an adhesive interposed therebetween is provided on the sleeve side or head portion side, the present invention is effective in that the bonding strength can be made greater than that conventionally available, thereby excellent adhesion durability can be realized.

What is claimed is:

1. An optical module comprising:
   a head portion molding an optical device with a resin; and
   a hollow sleeve, extending along a predetermined reference axis, provided with an opening for accommodating at least a part of said head portion;
   said sleeve being secured to said head portion, in a state accommodating a part of said head portion via said opening, with an adhesive interposed therebetween,
   said part of said head portion accommodated in said sleeve having an outer side face which is attached to said adhesive and is tilted with respect to said reference axis by a first angle,
   the remaining part of said head portion exposed from said sleeve having an outer side face tilted with respect to said reference axis by a second angle which is equal to or smaller than said first angle.

2. An optical module according to claim 1, wherein said remaining part of said head portion has a cross-sectional area orthogonal to said reference axis equal to or smaller than the cross-sectional area of said head portion coinciding with the opening face of said sleeve.

3. An optical module according to claim 2, wherein the cross-sectional area of said head portion orthogonal to said reference axis has a maximum value smaller than the opening area of said sleeve.

4. An optical module according to claim 1, further comprising a restriction structure for restricting a flow of said adhesive, at least one of said sleeve and said head portion being provided with said restriction structure.

5. An optical module according to claim 1, further comprising an auxiliary structure for enhancing bonding strength between said sleeve and said head portion, at least one of said sleeve and said head portion being provided with said auxiliary structure.

6. An optical module having a head portion molding an optical device with a resin; and a sleeve, extending along a predetermined reference axis, secured to said head portion, in a state accommodating at least a part of said head portion, with an adhesive interposed therebetween;

said optical module further comprising a restriction structure for restricting a flow of said adhesive injected between said sleeve and the part of said head portion accommodated in said sleeve, said restriction structure being provided on at least one of an inner wall face of said sleeve mating with the accommodated part of said head portion and an outer surface of the accommodated part of said head portion, wherein said sleeve comprises a plurality of through holes communicating an outer peripheral surface of said sleeve and the inside of said sleeve to each other.

7. An optical module according to claim 6, wherein said restriction structure includes a depression formed in an inner wall face of said sleeve mating with a part of said head portion.

8. An optical module according to claim 7, wherein the outer surface of the accommodated part of said head portion is provided with a lens body positioned on said reference axis, said depression being arranged so as to surround said lens body one of continuously and intermittently.

9. An optical module according to claim 6, wherein a surface of said head portion accommodated in said sleeve is provided with a lens body positioned on said reference axis, said restriction structure including a protrusion formed on said surface of said head portion so as to surround said lens body continuously or intermittently.

10. An optical module according to claim 6, further comprising an auxiliary structure for enhancing bonding strength between said sleeve and said head portion, at least one of said sleeve and said head portion being provided with said auxiliary structure.

11. An optical module having a head portion molding an optical device with a resin; and a sleeve, extending along a predetermined reference axis, secured to said head portion, in a state accommodating at least a part of said head portion, with an adhesive interposed therebetween;

said optical module further comprising an auxiliary structure for enhancing bonding strength between said sleeve and said head portion, said auxiliary structure provided on at least one of an inner wall face of said sleeve mating with the accommodated part of said head portion and an outer surface of the accommodated part of said head portion;

wherein at least one of the inner wall face of said sleeve mating with said first protrusion and the outer surface of the accommodated part of said head portion is provided with a pattern of irregularities each having a predetermined depth.

12. An optical module according to claim 11, wherein at least one of the inner wall face of said sleeve and the outer surface of the accommodated part of said head portion is embossed.

13. An optical module according to claim 11 wherein the irregularities comprise a plurality of depressions, each depression having a depth of less than about 20 $\mu$m.

14. An optical module according to claim 13, wherein the depressions have respective diameters of between about 20 $\mu$m and about 50 $\mu$m.

15. An optical module according to claim 14, wherein the depressions comprise between about 60% and about 90% of an area of the pattern.

16. An optical module according to claim 11, wherein at least the inner wall face of said sleeve is provided with a thread groove.

* * * * *